United States Patent [19]

Frischmann et al.

[11] Patent Number: 4,702,654
[45] Date of Patent: Oct. 27, 1987

[54] SPREADING ANCHOR

[75] Inventors: Albert Frischmann, Kenzingen; Johannes Rieger, Emmendingen; Kurt Mermi, Teningen; Herbert Kistner, Freiburg; E. Harald Zimmermann, Emmendingen, all of Fed. Rep. of Germany

[73] Assignee: Upat GmbH & Co., Emmendingen, Fed. Rep. of Germany

[21] Appl. No.: 910,408

[22] Filed: Sep. 22, 1986

[30] Foreign Application Priority Data

Oct. 3, 1985 [DE] Fed. Rep. of Germany ....... 3535262

[51] Int. Cl.⁴ ........................ F16B 13/04; F16B 13/06
[52] U.S. Cl. ...................................... 411/31; 411/55; 411/60
[58] Field of Search .................................. 411/29–31, 411/54, 55, 57, 77, 60; 175/284, 286, 287, 289

[56] References Cited

U.S. PATENT DOCUMENTS

| 3,353,437 | 11/1967 | Fischer | 411/31 |
| 4,339,217 | 7/1982 | Lacey | 411/55 |
| 4,402,637 | 9/1983 | Seghezzi et al. | 411/31 |
| 4,575,294 | 3/1986 | Mermi et al. | 411/77 |

FOREIGN PATENT DOCUMENTS

| 2103132 | 8/1972 | Fed. Rep. of Germany | 411/31 |
| 1183233 | 3/1970 | United Kingdom | 411/31 |

Primary Examiner—Neill Wilson
Attorney, Agent, or Firm—Jeffers, Hoffman & Niewyk

[57] ABSTRACT

A spreading anchor comprising an anchor rod (1) including a spreading cone (5) on its front end (4) in the direction of insertion of said anchor (1), the spreading cone (5) flaring in the insertion direction and adapted to cooperate with a spreading sleeve (9) which is provided with several longitudinal slots (10), said slots (10) originating from the front rim (11) of said spreading sleeve (9) and forming spreading lamellae (18), at least two of said spreading lamellae (18) being opposed, the end faces (21) of said opposed lamellae (18) in the insertion direction being provided with cutting inserts.

9 Claims, 5 Drawing Figures

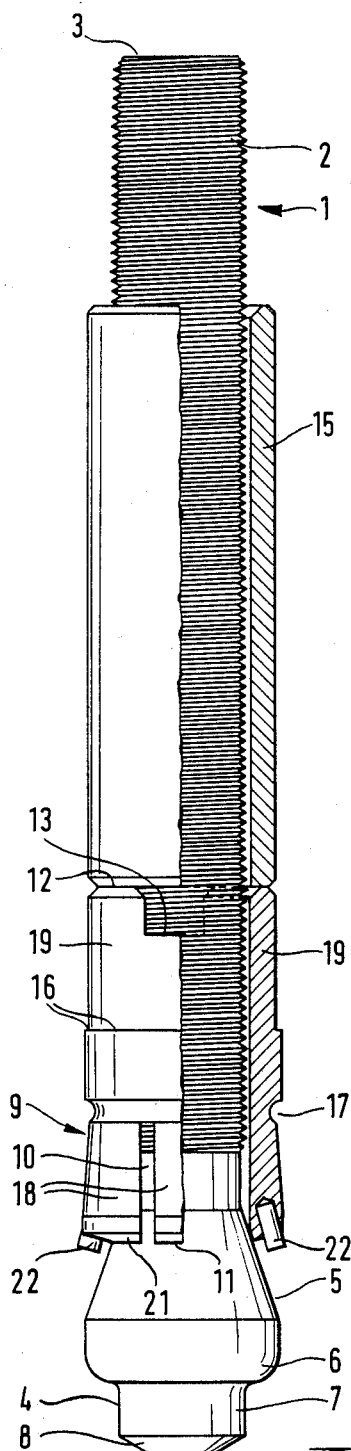
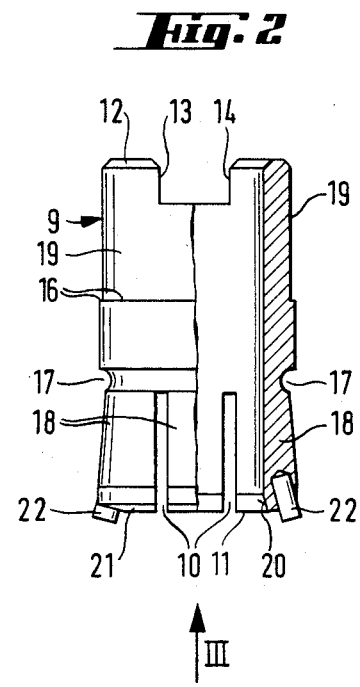
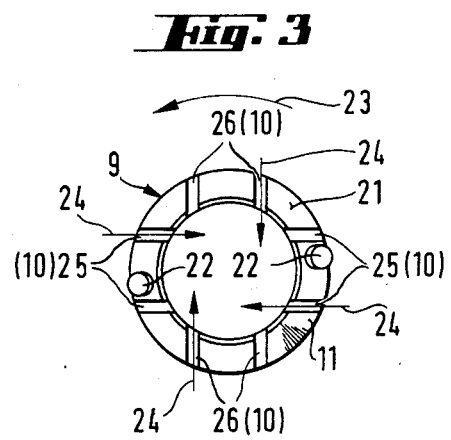

SPREADING ANCHOR

BACKGROUND OF THE INVENTION

This invention relates to a spreading anchor for anchoring in a cylindrical bore hole which is formed in the ground. More specifically, this invention relates to an anchor including a flared cone portion on which is disposed a spreading sleeve and having a plurality of spreading lamellae at the front end thereof.

A prior art spreading anchor of this type is shown in U.S. Pat. No. 4,339,217, which anchor serves to anchor objects in the ground in which is prepared a cylindrical bore hole with a conical relief area at the bottom thereof. A special tool is required to form the conical relief area, which results in a time-consuming operation for placing such prior art spreading anchors.

It is, therefore, desired to provide a spreading anchor which provides for time-saving handling and placement and which does not require a special drill for providing the relief.

SUMMARY OF THE INVENTION

The above-described problem is overcome by the present invention by providing an anchor having at least two opposed spreading lamellae which include cutting inserts on their end faces and which point in the direction of insertion of the anchor. More particularly, the invention provides a spreading anchor including an anchor rod which includes a spreading cone on the front end thereof. The spreading cone flares outwardly in the insertion direction and has a spreading sleeve disposed thereon. The spreading sleeve includes several longitudinal slots which originate at the front rim of the spreading sleeve and form spreading lamellae.

The spreading lamellae include cutting inserts on the end faces thereof near the front rim of the spreading sleeve and which form a relief portion in the bore in which the anchor is to be disposed.

An advantage of the present invention is that the cutting inserts on the end faces of the spreading sleeve permit using the spreading sleeve not only as an anchoring element but also as a relief cutting tool for drilling a relief in the bored hole into which the anchor is inserted. All that is required for that purpose is to impart to the spreading sleeve, upon insertion of the anchor rod and spreading sleeve which is disposed thereon, a rotary motion during the driving operation by means of a setting tool, so that the cutting inserts will form a relief in the previously drilled cylindrical bore hole.

In a preferred embodiment, the spreading lamellae are so designed that their wall thickness increases toward their end faces. A predetermined bending point for the spreading lamellae is formed by an annular groove which extends circumferentially around the spreading sleeve at the point to which the longitudinal slots extend. To permit proper engagement of the spreading sleeve with the setting tool, a pair of entraining claws or recesses are provided on the end face of the spreading sleeve opposite the cutting inserts. The longitudinal slots are situated in planes which are abaxial with respect to the axis of the anchor. In a preferred embodiment, the longitudinal slots are situated in two pairs of planes of which the first pair define with the face of the anchor a first pair of chords and of which the second pair extends at right angles to the first pair at equal mutual spacing. The pin-shaped cylindrical cutting inserts are tilted relative to the longitudinal axis of the spreading sleeve and are arranged on the front faces of the spreading lamellae. The cutting inserts are offset in the direction of rotation relative to the longitudinal axis of the spreading lamellae, to thereby achieve a maximally favorable cutting geometry.

BRIEF DESCRIPTION OF THE DRAWINGS

The above-mentioned and other features and objects of this invention, and the manner of attaining them, will become more apparent and the invention itself will be better understood by reference to the following description of the embodiment of the invention taken in conjunction with the accompanying drawings, wherein:

FIG. 1 shows a side elevation, in half section, of the spreading according to the invention;

FIG. 2 shows the spreading sleeve for the spreading anchor of FIG. 1;

FIG. 3 shows a bottom plan view of the spreading sleeve of FIG. 2;

Corresponding reference characters indicate corresponding parts throughout the several views of the drawings.

Figure 4:
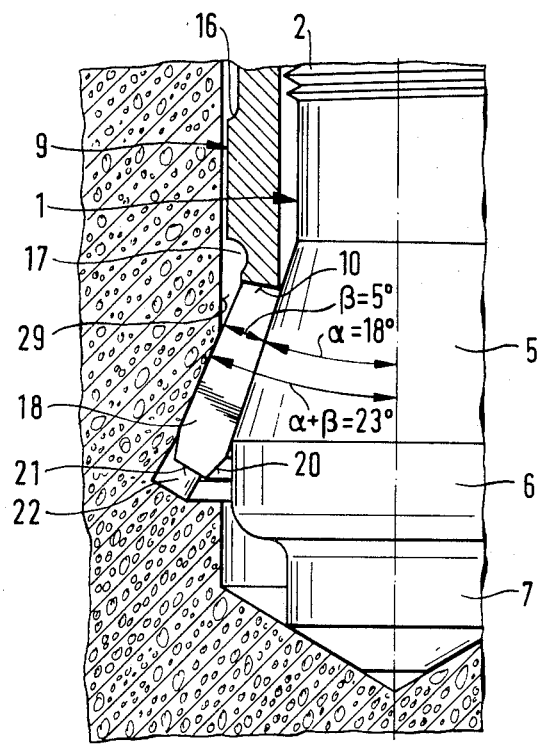
FIG. 4 shows an enlarged partial sectional view of the spreading anchor of FIG. 1 after insertion into a bore.

The exemplifications set out herein illustrate a preferred embodiment of the invention, in one form thereof, and such exemplifications are not to be construed as limiting the scope of the disclosure or the scope of the invention in any manner.

DESCRIPTION OF THE PREFERRED EMBODIMENT

As shown in FIG. 1, the spreading anchor comprises an anchor rod 1 having external threads 2 which permit mounting an object on the rear end 3, shown at the top in FIG. 1, of anchor rod 1.

The external threads 2 extend to the vicinity of a spreading cone 5 formed in near the front end 4 of anchor rod 1. The spreading cone 5 flares toward the front end 4 and extends to a first cylindrical portion 6 which forms a shoulder and whose diameter is greater than the part of the anchor rod 1 which is provided with external threads 2.

Anchor rod 1 includes a second cylindrical portion 7 which is formed on anchor rod 1 forwardly of first cylindrical portion 6 in the direction of insertion of the anchor. Second cylindrical portion 7 has a diameter which equals the diameter of the external threads 2. The end face of the second cylindrical portion 7 is fashioned as a truncated cone 8 and forms an obtuse surface for centering anchor rod 1 at the bore hole bottom of a cylindrical bore hole which is drilled in the ground for setting the spreading anchor. A spreading sleeve 9 which may be forced onto spreading cone 5 includes several longitudinal slots 10 which extend rearwardly from the sleeve front rim 11 in the longitudinal direction of the spreading sleeve 9. Sleeve rear rim 12 is provided with two radially opposed entrainment claws 13, 14 which extend into spreading sleeve 9 and are shaped as rectangularly defined recesses. A spacer sleeve 15 may be forced onto anchor rod 1 into contact with rear rim 12 of spreading sleeve 9. Spacer sleeve 15 may consist of a material which is different than the material of spreading sleeve 9 and may also have a diameter different from the diameter of spreading sleeve 9, so that binding of sleeve 15 in the bore hole may be prevented and the machine used for setting anchor 1 will not require very high driving power, due to the separating of spreading sleeve 9 and spacer sleeve 15.

As can be seen best from FIG. 2, the inside diameter of the spreading sleeve 9 is constant throughout sleeve 9 and does not change in the longitudinal direction of the spreading sleeve 9. In contrast, it can be seen from FIG. 2 that the outside diameter of the spreading sleeve 9 is the greatest approximately in the longitudinal center of spreading sleeve 9, as a larger portion 16 is formed on the outer surface of spreading sleeve 9. Portion 16 has a slightly larger diameter than area 19 of sleeve 9 which is located between portion 16 and sleeve rear rim 12.

The front end of portion 16 closest to the front end of the spreading anchor adjoins an annular groove 17 which forms a preselected bending point for the spreading lamellae 18 formed by the longitudinal slots 10 and which extend up to annular groove 17.

As best seen in FIGS. 1 and 2, spreading lamellae 18 are beveled as at 20 on the inside of sleeve front rim 11. The angle of bevel 20 is approximately equal to the taper angle of spreading cone 5. The front faces 21 of spreading lamellae 18 are beveled and extend at right angles to the longitudinal axis of the anchor rod 1.

The spreading sleeve 11 is provided with at least two cutting inserts 22 which may be formed as cylindrical carbide pins. As can be seen in FIGS. 1 and 2, cutting inserts 22 are tilted relative to the longitudinal axis of spreading sleeve 9.

FIG. 3 illustrates that the cutting inserts 22, furthermore, are offset in the direction of rotation relative to the longitudinal central axis of the spreading lamellae 18. This offset produces, in the spreading process of the spreading sleeve 9, a cutting geometry which permits effective chip removal during the relief operation which takes place after the spreading anchor is placed in a cylindrical bore in the ground, as the spreading sleeve 9 is rotationally forced onto the spreading cone 5 with the aid of a setting tool. The spreading sleeve 9 expands during such a setting operation and causes the cylindrical bore, which was predrilled in the ground, to be relieved. The anchor rod 1 and the spreading sleeve 9 remain in the bore hole after the spreading process, so that the spreading sleeve 9 and the anchor rod 1, in addition to acting as a relief tool, function as a fastening element. After slipping spacer sleeve 15 in place on anchor rod 1, the object to be fastened may be attached to the rear end 3 of the anchor rod 1 which protrudes beyond the bore hole rim by means of a washer and a nut which engages with threads 2.

In addition to the offset arrangement of cutting inserts 22, FIG. 3 also shows the noncentered arrangement of longitudinal slots 10. Moreover, the direction of rotation of the spreading sleeve 9 is indicated by arrow 23. The direction of chip removal is indicated by arrows 24.

From FIG. 3 it can be seen that the longitudinal slots 10 are situated in four planes of which the first pair 25, in cross section, defines with the front face 21 of the spreading sleeve 9 a first pair of chords and of which the second pair 26 extends at a right angle to the first pair at equal mutual spacing. Formed in this way are eight spreading lamellae 18 of which four have a first shape and four more have a second shape. In a preferred embodiment, the cutting inserts 22 are contained on two opposed spreading lamellae 18 whose lateral slot faces extend parallel to one another.

Figure 5:
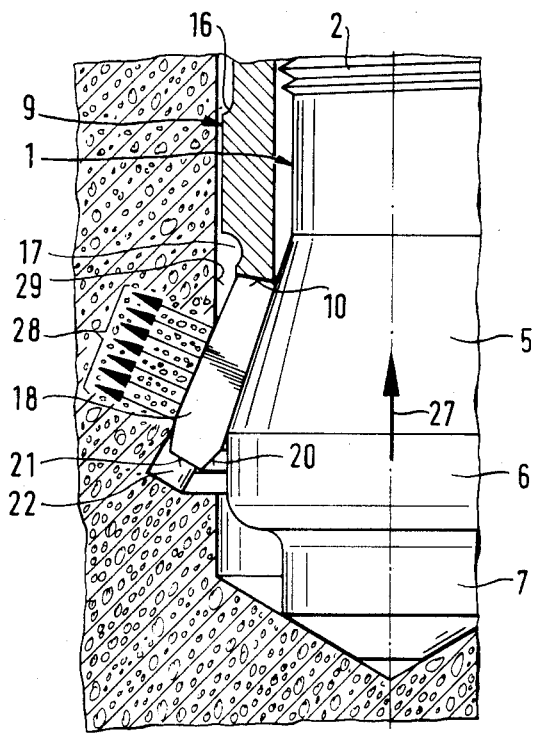
FIG. 5 shows an enlarged partial sectional view of the spreading anchor of FIG. 1 after insertion into a bore and of the force distribution in the bore hole on the cylindrical surface of the spreading sleeve.

FIGS. 4 and 5 show anchor rod 1 after its insertion into a cylindrical bore and further show the longitudinal orientation of the spreading lamellae 18 which results from the fact that the wall thickness of spreading lamellae 18 increases toward the end faces 21. If the taper angle $\alpha$ is, by way of example, 18° and the internal angle of the tapering sides of spreading lamellae 18 is $\beta = 5°$, the taper angle of the cylindrical surface of the spreading sleeve 9 equals the sum of the two above angles, i.e., $18° + 5° = 23°$.

What is accomplished by the conical taper of the spreading lamellae 18 is that the relief angle of the inserted fastening element in bore hole 29 is about 10° greater than the angle of the bulge of cone 5, i.e., 46° instead of 36°. The distribution of forces in the anchoring area is also considerably improved thereby, as illustrated in FIG. 5. As a traction or pulling force is introduced in the direction of arrow 27, the force distribution which occurs on the cylindrical surface of the spreading lamellae 18 is indicated by the arrows 28. The spreading force decreases in the axial direction toward the end face 21 of the spreading lamellae. Thus, whereas the force increases axially beginning at the front end 4 of the anchor, the force decreases in FIG. 5 horizontally toward the left, which results in a reduction of the spreading force toward end face 21. What is thereby provided is dependable spreading of the spreading lamellae 18 during the setting operation as they rotate on the spreading cone 5, and a maximum relief of the bore hole.

The conical taper of the spreading shank permits easy setting of the anchor because the spreading lamellae 18, as they slide in the relief space, will not bind at the bending point while they, in their final position, bear on the relieved bore hole wall without play.

Since the tapered spreading cone 5 in the front area of the anchor rod 1 extends into a first cylindrical portion 6, the latter prevents the spreading lamellae 18 from buckling and bending as traction force is applied to the anchor rod. The offset second cylindrical shoulder 7 at the bottom end of the anchor rod 1, forms the necessary free space in the cylindrical bore for accommodating the debris and chips formed during the relief operation.

It should be understood that, instead of the spacer sleeve 15, several identical or different spacer sleeves may be used as well.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. A spreading anchor comprising an anchor rod (1) including on the front insertion end thereof a cone (5) which flares radially outwardly in the direction of insertion and on which a spreading sleeve (9) is operatively movably disposed, said spreading sleeve (9) including a plurality of longitudinal slots (10) which originate at the front face of the spreading sleeve and form a plurality of spreading lamellae (18), at least two of said spreading lamellae (18) being opposed and having cutting inserts

(22) secured on their end faces (21) which point in the direction of insertion of said anchor, the wall thickness of said spreading lamellae (18) increasing in the direction of the lamellae end faces (21).

2. The spreading anchor according to claim 1, wherein the cutting inserts (22) are pin shaped.

3. The spreading anchor according to claim 1, wherein the longitudinal slots (10) extend up to an annular groove (17) formed in said spreading sleeve (9).

4. The spreading anchor according to claim 3, wherein said spreading sleeve (9) includes a cylindrical portion (16) on the side of said annular groove (17) which faces away from said spreading lamellae (18).

5. The spreading anchor according to claim 1, wherein engaging claws (13, 14) are provided on the end face (12) of the spreading sleeve (9) opposite said cutting inserts (22).

6. A spreading anchor comprising an anchor rod (1) including on the front insertion end thereof a cone (5) which flares radially outwardly in the direction of insertion and on which a spreading sleeve (9) is operatively movably disposed, said spreading sleeve (9) including a plurality of longitudinal slots (10) which originate at the front face of the spreading sleeve and from a plurality of spreading lamellae (18), said longitudinal slots (10) extending up to an annular groove (17) formed in said spreading sleeve (9), said spreading sleeve (9) including a cylindrical portion (16) on the side of said annular groove (17) which faces away from said spreading lamellae (18), the inside diameter of said spreading sleeve (9) being constant in the axial direction, the outside diameter of said spreading sleeve (9) being the greatest in the area of said cylindrical portion (16) and being substantially equal to the outside diameter on the front end of said unspread spreading lamellae (18), at least two of said spreading lamellae (18) being opposed and having cutting inserts (22) secured on their end faces (21) which point in the direction of insertion of said anchor, the wall thickness of said spreading lamellae (18) increasing in the direction of the lamellae end faces (21).

7. The spreading anchor according to claim 1, wherein said longitudinal slots (10) are situated in planes which are abaxial to the axis of said spreading sleeve (9).

8. A spreading anchor comprising an anchor rod (1) including on the front insertion end thereof a cone (5) which flares radially outwardly in the direction of insertion and on which a spreading sleeve (9) is operatively movably disposed, said spreading sleeve (9) including a plurality of longitudinal slots (10) which originate at the front face of the spreading sleeve and form a plurality of spreading lamellae (18), said longitudinal slots (10) being situated in two pairs of planes which are abaxial to the longitudinal axis of said spreading sleeve (9), the first pair of said planes, in cross section, defining with said spreading lamellae end faces (21) a first pair of chords and the second pair (26) extending at right angles to the first pair (25) at equal mutual spacing, at least two of said spreading lamellae (18) being opposed and having cutting inserts (22) secured on their end faces (21) which point in the direction of insertion of said anchor, the wall thickness of said spreading lamellae (18) increasing in the direction of the lamellae end faces (21).

9. The spreading anchor according to claim 2, wherein said cutting inserts (22) comprise cylinders which are tilted relative to the longitudinal axis of said spreading sleeve (9) and are arranged on the spreading lamellae end faces (21), said cylinders being offset in the direction of rotation relative to the longitudinal axis of said spreading sleeve (9).

* * * * *

UNITED STATES PATENT AND TRADEMARK OFFICE
CERTIFICATE OF CORRECTION

PATENT NO. : 4,702,654

DATED : October 27, 1987

INVENTOR(S) : Albert Frischmann et al

It is certified that error appears in the above-identified patent and that said Letters Patent is hereby corrected as shown below:

Claim 6, Col. 5, line 24, change "from" to --form--.

Signed and Sealed this

Twenty-ninth Day of March, 1988

Attest:

DONALD J. QUIGG

*Attesting Officer*   *Commissioner of Patents and Trademarks*